June 8, 1965  R. A. CUDE ETAL  3,188,121
CABLE SHEATH PRESSURE TAP FITTING
Filed Dec. 12, 1961

INVENTORS
RICHARD A. CUDE
LEON R. MILLER
BY

ATTORNEY

3,188,121
CABLE SHEATH PRESSURE TAP FITTING
Richard A. Cude, Thousand Oaks, and Leon R. Miller, Los Angeles, Calif., assignors to Rezolin, Inc., Santa Monica, Calif., a corporation of California
Filed Dec. 12, 1961, Ser. No. 158,835
4 Claims. (Cl. 285—197)

This invention relates to a fitting for making a pressure connection to the enclosing sheath of multiple electric wire cables such as telephone cables.

Bundles of insulated wire conductors are commonly placed inside a weather resistant sheath of lead or other protective materials. These cables, either in newly formed condition or after being buried or mounted on supports above ground, develop small, difficultly detectable leaks which result in moisture contacting the conductors in the sheath, causing noise and interference in communications circuits. Finding the small leaks in installed cables is both difficult and expensive. To overcome the electrical effects of these insidious moisture leaks, it is now common practice to maintain air pressure inside the cable sheath to prevent inward leaks of moisture. To isolate portions of the cables, it is also customary to provide dams inside the sheaths at selected locations, these dams being formed by injection of a liquid material which hardens and fills the space around the wires for a sufficient length (along the cable) to effectively hold the air pressure. For both of these purposes it is necessary to make an opening into the sheathing leading to the interior, and then provide an outwardly projecting fitting which must be soldered or welded to the sheath, a job which is very difficult when working on a pole-suspended cable, or in conduits or manholes.

One object of this invention is to provide an easily applied pressure fitting for a multiple-wire cable sheath. Another object is to provide a pliable molded synthetic plastic pressure fitting which may be applied to a wide variety of sizes of sheaths. Another object is to provide a sheath fitting having large surface contact for making a pressure seal between the fitting and the surface of the sheath. Still another object is to provide a pressure-adhesive type gasket between the sheath surface and the fitting, to hold it in place while tension tape is being applied, and to make a leak-proof connection with the sheath.

These and other objects are attained by my invention, which will be understood from the following description, reference being made to the accompanying drawings, in which—

Figure 1:
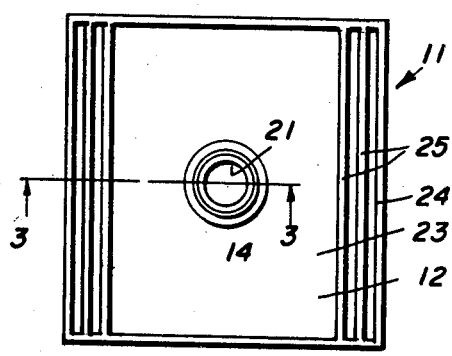
Figure 3:
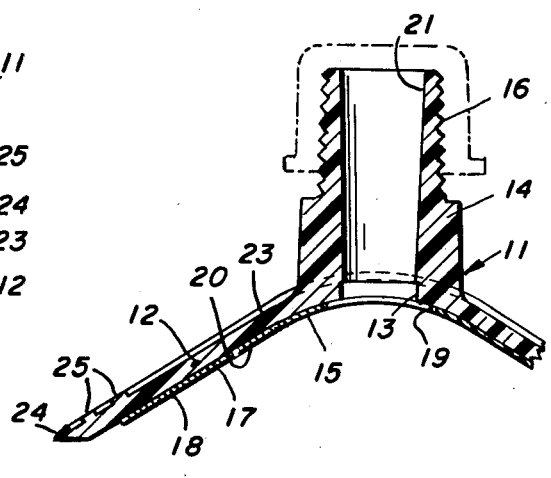
Figure 2:
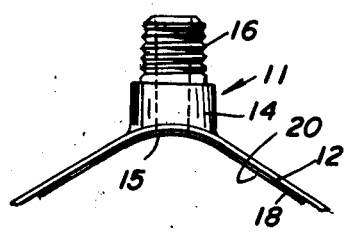
Figure 4:
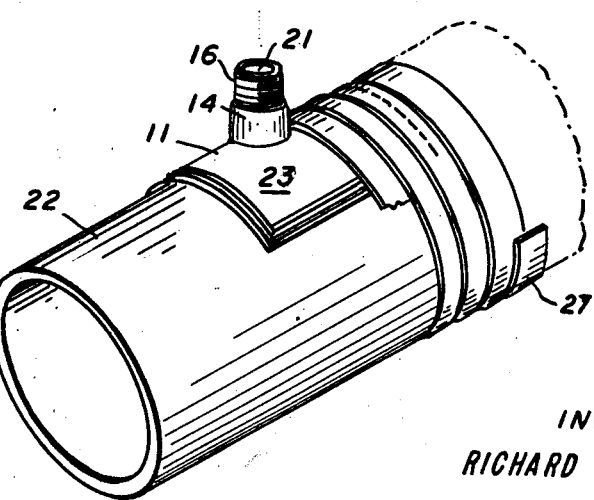
Figure 5:
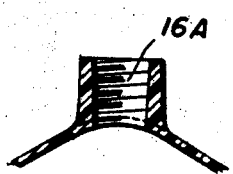

FIG. 1 is a top plan view of one form of our invention;
FIG. 2 is an end elevation of the same;
FIG. 3 is a cross-sectional view taken on the line 3—3 of FIG. 1;
FIG. 4 is a perspective view of the fixture attached to a cable sheath by tape windings; and
FIG. 5 is a fragmentary side elevational view of another form of fitting riser.

Referring to the drawings, the cable sheath pressure tap fitting 11 consists in its preferred form of a base portion 12 molded from a flexible and pliable material such as rubber or pliable rubber-like synthetic plastic materials, preferably high density polyethylene, the base portion being approximately one-third to seven-eighths the circumference of the cable sheath on which it is to be used, and of about the same length. The base portion 12 is provided with an opening 13 around which projects the integral tubular riser 14, the central area 15 of the base portion 12 being molded to a curvature which approximates the curvature of the cylindrical surface of the cable sheath to which the fitting is to be applied. Because of the inherent pliability of the base portion, a median curvature may be molded in, and thereafter the fitting may be used on a fairly wide range of cable sheath sizes. The riser 14 is provided with means for attachment of a hose fitting or similar device, or a closure cap; as shown this attachment means is preferably molded-in outside threads 16, or alternatively (as shown in FIG. 5) molded internal threads 16A.

The contact or concave surface 17 of the base portion 12 is preferably provided with a gasket 18 which has a central opening 19 coinciding with the opening 13 of the base portion 12 and with the opening 21 in the tubular riser 14. The gasket 18 is adhesively attached to the surface 17. The exposed surface 20 of the gasket (which makes contact with the cable sheath) is composed of a pressure sensitive adhesive. Preferably, the gasket 18 consists of a cotton cloth tape, both sides of which have been impregnated with a rubber base adhesive. For convenience, the outer surface 20 may be temporarily protected by a removable crepe paper cover (not shown) which is peeled off at the time the fitting is applied to the cable sheath.

The adhesive material on the tape is of such a nature that a good air-tight seal is provided between the contact surface 17 of the fitting 11 and the outer surface of the cable sheath 22, regardless of the material of the sheath, which may be lead, synthetic plastic or other sheath-forming materials. While liquid adhesives may be used, if applied carefully in the correct amount so that it does not flow into the orifice, the preferred adhesive is one which is not liquid but is a sheeted-out composition on cloth tape having pressure-adhesive surface characteristics for both the fitting and the cable sheath surfaces. One such material is known in the trade as Permacel tape P-50S, made by the Permacel Tape Corporation, a division of Johnson & Johnson, of New Brunswick, New Jersey.

The upper or convex surface 23 of the base portion 12 may be smooth but is preferably provided with a flat ridge or band 24 on the outer border, in order to more surely and positively hold the margin against the cable sheath surface to avoid leaks when gaseous or liquid pressure is applied through the fitting. It will be understood that the fitting of this invention, after it is adhesively applied over a prepared hole in the cable sheath, is additionally held on the sheath by a winding of "friction" tape 27 or the like applied over the base portion and around the cable sheath, to secure the fitting against pressure applied to the inside of the cable. (See FIG. 4.)

Hose clamps may also be used to secure the fitting to the cable sheath instead of the tape winding.

Other ridges 25, spaced from and parallel to the margin ridges 24 may also be provided, to hold the base portion more securely to the sheath surface, especially when the fitting is used on cables having diameters smaller than the central curved area 15 for which the fitting was especially made.

The fitting is preferably molded from high density polyethylene plastic, but rubber or other pliable synthetic plastic materials having properties similar to high density pliable polyethylene may also be used.

The fittings of this invention may be used for testing for air pressure, or for application of air pressure, or for introduction of a hardenable liquid cement to form a pressure dam inside the cable, or for other purposes.

The advantages of our invention will be apparent. The molded synthetic plastic fitting may be kept in place on the sheath for a long time without danger of corrosion. A single size fitting, because of the pliability, may be used for a wide range of diameters of cables. The fitting may be adjusted even to irregular or tapered cable sheaths. The ease of application of the fitting to the sheath reduces the time and cost of providing these taps either temporarily or permanently on mounted cable sheaths.

The objectives named in the beginning have been attained.

We claim:

1. A cable sheath pressure tap fitting comprising a substantially cylindrically curved surface-contacting base member formed of pliable elastomeric material, and an apertured riser integral with said base member, said latter member being provided with a gasket attached to and covering a major part of the area of the inner face thereof, said gasket being coated with a pressure sensitive adhesive, said gasket being adapted when in contact with the outer surface of said cable sheath to act as a seal between said sheath and the inner face of said base member, said gasket extending nearly to the longitudinal edges of said base member, flat ridges located at least on said longitudinal edges of the outer surface of said base member, said longitudinal edges having an inner bevel adapted to provide leverage about the longitudinal edges of said gasket as a fulcrum and insure firm contact of said edges with the surface of said cable sheath when pressure is applied upon said ridges by means of a tension band.

2. A fitting according to claim 1 wherein said gasket is provided with a pressure sensitive coating on both sides thereof.

3. A fitting according to claim 1 wherein said elastometric material is a high density polyethylene plastic composition.

4. A fitting according to claim 1 wherein said riser is provided with connecting threads.

References Cited by the Examiner
UNITED STATES PATENTS

| | | | |
|---|---|---|---|
| 1,744,887 | 1/30 | Gruene | 285—197 |
| 2,148,419 | 2/39 | Parker | 285—200 |
| 2,636,520 | 4/53 | Geist | 285—200 |
| 2,703,721 | 2/55 | Montgomery | 285—197 |
| 2,708,578 | 5/55 | Mitchell | 154—53.5 |
| 2,884,265 | 4/59 | Boughton | 285—197 |
| 2,924,546 | 2/60 | Shaw | 138—99 |
| 2,942,902 | 6/60 | Rowland | 285—197 |
| 3,036,945 | 5/62 | Souza | 154—53.5 |

FOREIGN PATENTS 1,155,994  12/57  France.

CARL W. TOMLIN, *Primary Examiner.*